United States Patent [19]
Tsunekawa et al.

[11] 3,885,880
[45] May 27, 1975

[54] LIGHT SENSING DEVICE WITH AUXILIARY ILLUMINATION

[75] Inventors: Tokuichi Tsunekawa, Yokohama; Soichi Nakamoto, Tokyo; Tetsuya Taguchi, Kawasaki; Takehiko Kiyohara, Zama, all of Japan

[73] Assignee: Canon Kabushiki Kaisha, Japan

[22] Filed: Nov. 7, 1973

[21] Appl. No.: 413,494

[30] Foreign Application Priority Data
Nov. 9, 1972  Japan............................ 47-112284

[52] U.S. Cl. ............................. 356/226; 250/214 P
[51] Int. Cl. ............................................. G01j 1/16
[58] Field of Search ............ 250/214 P; 354/24, 53, 354/54, 56, 57, 60; 356/226

[56] References Cited
UNITED STATES PATENTS

| | | |
|---|---|---|
| 2,499,996 | 3/1950 | Kelsey................................ 356/226 |
| 3,581,643 | 6/1971 | Yoshimura....................... 356/226 X |
| 3,679,905 | 7/1972 | Watanabe..................... 250/214 P X |
| 3,753,388 | 8/1973 | Toyoda............................ 356/226 X |
| 3,781,119 | 12/1973 | Mori.................................. 354/24 X |

*Primary Examiner*—Archie R. Borchelt
*Attorney, Agent, or Firm*—McGlew and Tuttle

[57] ABSTRACT

The light sensing device includes a diode having a logarithmic compression characteristics, or a circuit with compression characteristics, and a light receiving element to receive light from an object. An irradiating element provides auxiliary illumination, at an early state of light sensing, at the light receiving plane of the light receiving element, so that the delay in response, caused by the compression characteristics element in the light sensing circuit and by other elements within the light sensing circuit, is compensated by exciting the irradiating element.

8 Claims, 4 Drawing Figures

LIGHT SENSING DEVICE WITH AUXILIARY ILLUMINATION

BACKGROUND OF THE INVENTION

Field of the Invention

The present invention relates to a circuit to sense the light from an object, particularly to an improved light sensing circuit for an object with a low level of brightness.

In recent light sensing circuits used in a still camera, an exposure meter, etc., a high response speed is desired. For satisfying such requirements various kinds of light sensing elements with fast response speed are being developed and, at present a silicon blue cell is generally used.

However, even if a silicon blue cell is used as a light receiving element in a light sensing circuit, when the incident light is weak, that is, the brightness of an object field to be sensed is at low level, because of the capacity elements within an amplifier of the light sensing circuit, or the diode, etc., provided for compressing the output of the light receiving element, the response of the light sensing circuit tends to become slow the same as heretofore. Therefore when such a light sensing circuit with slow response speed is used as a light sensing means for a camera in photographing, it has a shortcoming in that proper exposure can not be obtained when a camera is turned quickly from a dark place to a bright spot with photographing being done immediately.

SUMMARY OF THE PRESENT INVENTION

The object of the present invention is to provide a unique light sensing device in which the above mentioned shortcomings of the conventional devices is eliminated.

Another object of the present invention is to provide a light sensing device with little power loss.

Further, another object of the present invention is to provide a light sensing device in which an irradiating means, for effecting preliminary irradiation in an early stage of light sensing, is provided at the light receiving plane of a light receiving element, so that, by exciting the irradiating means for a prescribed length of time by an exciting means, the delay in response, caused by the element with compression characteristics in the light sensing circuit and other capacity components within the light sensing circuit, can be compensated.

Other objects of the present invention will become apparent from the detailed explanations of the present invention given below together with the drawings.

DESCRIPTION OF THE PREFERRED EMBODIMENTS

Figure 1:
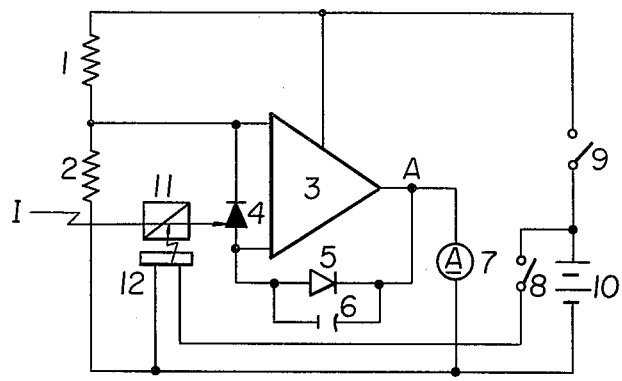
FIG. 1 is an electric circuit connection diagram illustrating an example of the light sensing device of the present invention.

FIG. 1 is a circuit connection diagram illustrating an example of the light sensing device of the present invention. In the drawing, 1, 2 are voltage dividing resistances for an operation amplifier 3. 4 is a light receiving element such as silicon blue cell, etc. 5 is a logarithmic conversion element having logarithmic compression characteristics, such as a diode, etc. 6 is a noise prevention capacitor for discharging an accumulated charge responsive to sudden changes in the light from an object. 7 is an indicator, such as a meter, to indicate the output from the operation amplifier 3. 8 is an electric switching means consisting of an instantaneous switch for instantaneously illuminating an exciting light source 12, such as a lamp or a luminous diode, etc. provided adjacent the light receiving element 4, or a mono stabilizing multi-vibrator, etc. 9 is a main switch. 10 is a direct current power source, and 11 is a semi-transparent mirror.

When light sensing is done in the device having the above set-up, first the main switch 9 is closed. By this, a voltage is impressed from the power source 10 on the amplifier 3, placing the light sensing circuit in a sensing state, and a voltage proportionate to that of the power source 10 is impressed on the indicator 7, indicating the maximum amplitude. On the other hand, when the switch 8 is only instantaneously closed simultaneously with main switch 9, voltage is impressed from the power source 10 on the exciting light source 12 during the period that the switch 8 is closed, and the exciting light source 12 projects light onto the light receiving element 4 through the semi-transparent mirror. In the present invention, the light from the exciting light source, because of its sufficiently high brightness, instantaneously charges the electrostatic capacity of the logarithmic conversion element 5, the capacitor 6, the amplifier 3, etc. When an object is dark and the amount of light incident upon the light receiving element 4 is small, the large electric charge accumulated in capacitor 6 is discharged through the logarithmic conversion element 5. As the electric charge discharged from the capacitor 6, etc., based on the illumination of the exciting light source 12 is effective in a direction to lower the electric potential of the indicator 7, the output current from the output end A of the light sensing circuit instantaneously drops from the above mentioned maximum output current and reaches a stationary state. This state is shown by curve S in FIG. 2 (B). On the other hand, when an object is bright the light receiving element 4 is further excited and the output current of the light sensing circuit reaches instantaneously a stationary state due to the large magnitude of the photocurrent.

As a result, such a shortcoming as deterioration in the response characteristics will be eliminated even in light sensing with a dark object and low brightness light source, and by inserting the logarithmic conversion element in the light sensing circuit the output of the light sensing circuit can be made linear. The current response characteristic of the light sensing circuit of the present invention is shown in FIG. 2(B). In the drawing the axis of abscissas shows the time elapsed after sensing is started, and the axis of ordinates indicates the output current in the light sensing circuit, while R shows the output current characteristic curve of a conventional light sensing circuit, and the curve R' shows the same in the case when the brightness of incident light is weaker than that for the curve R. S shows the output current characteristics curve of the light sensing circuit according to the present invention. While there is a waveform in pulse shape in an early stage of light sensing in the curve S, it indicates that the exciting light source is excited at such time incident.

Figure 2A:
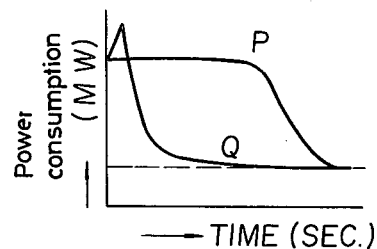
FIGS. 2 (A)(B) are characteristics comparison drawings for both circuits, i.e., a conventional light sensing circuit and the light sensing circuit of the present invention.
Figure 2B:
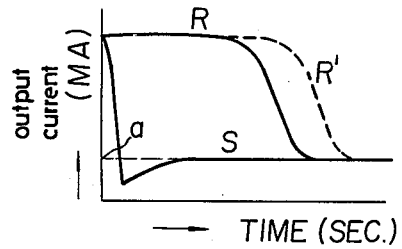

FIG. 2 (A) is a drawing showing that the power consumed by the circuit becomes smaller by the present invention than that in the conventional circuit, wherein the axis of abscissas indicates the time elapsed after light sensing is started, while the axis of ordinates shows power consumed by the light sensing circuit.

Curve P is the characteristic curve of power consumed by the light sensing circuit of conventional type, while curve Q is the characteristic curve of power consumed by the light sensing circuit according to the present invention. In the curve Q, there is a waveform of pulse shape at the early stage of light sensing, and it shows that exciting light source is excited at this time instant. It is shown that even in this case total loss in the consumed power is smaller in curve Q than that in curve P.

Figure 3:
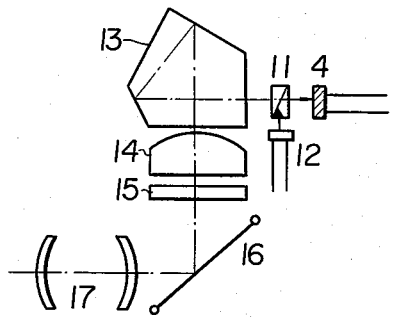
FIG. 3 shows an example of the present invention as applied to a camera.

FIG. 3 shows an example of the present invention as applied to a camera, illustrating details of a light receiving part. 17 is a lens system which has the light from an object incident thereinto. 16 is a quick return mirror. The light receiving part, consisting of the lens group 17, has the function of directing light incident thereupon to a lens system consisting of a pentagonal prism 13, a condensor lens 14 and a focussing lens 15. Light thus directed into the lens system is incident upon the semi-transparent mirror 11, by virtue of being redirected by pentagonal prism 13.

As a result of above, even if an object is dark and the brightness incident upon a light receiving element is low, the response speed of the light sensing circuit will not become slow in the present invention, and an output current proportionate to the amount of incident light from an object can be obtained. Thus it is not only convenient for use, but the power consumed in the light sensing circuit can be reduced, so that the life of the power source can be made longer.

Also by using the above mentioned exciting light source 12 also as a check lamp for battery check of a camera, the set-up using the present invention can be very much simplified.

What is claimed is:

1. A light sensing device comprising, in combination, a photovoltaic cell generating an electric signal proportional to the light intensity incident thereupon, and having an output; a direct current operational amplifier having an input connected to the output of said cell and having an output; a source of d.c. potential; switch means selectively operable to connect said source to said amplifier to provide an operating potential thereto to initiate a light sensing operation; indicating means connected to the output of said amplifier to indicate a light value responsive to the amplified electric output signal of said cell; irradiating means operable, when energized, to emit light incident upon said cell; and means operable, upon initiation of a light sensing operation, to connect said irradiating means to said source for at least momentarily energizing said irradiating means.

2. A light sensing device, as claimed in claim 1, comprising a first feedback loop, including said amplifier, effecting logarithmic transformation of the output signal of said cell and relating the amplifier output signal proportionately to a diode generated signal.

3. A light sensitive device, as claimed in claim 1, in which said cell is a silicon blue cell.

4. A light sensing device, as claimed in claim 2, wherein said first feedback loop includes a diode.

5. A light sensing device, as claimed in claim 2, comprising a second feedback loop including said amplifier; and a capacitor included in said second feedback loop.

6. A light sensing device, as claimed in claim 1, including a semi-transparent mirror positioned adjacent said cell, light from a scene being incident upon said cell through said semi-transparent mirror; said irradiating means comprising a light source positioned adjacent said semi-transparent mirror, and a light from said light source being reflected to said cell by said semi-transparent mirror.

7. A light sensing device, as claimed in claim 1, including a diode and a condensor connected, in parallel with each other, between the input and output of said amplifier.

8. A light sensing device, as claimed in claim 1, in which said switch means comprises a main switch; said means operable to connect said irradiating means to said source comprising an instantaneously operable switch.

* * * * *